G. H. HAYES.
VEHICLE WHEEL.
APPLICATION FILED AUG. 13, 1917.
1,258,216.
Patented Mar. 5, 1918.
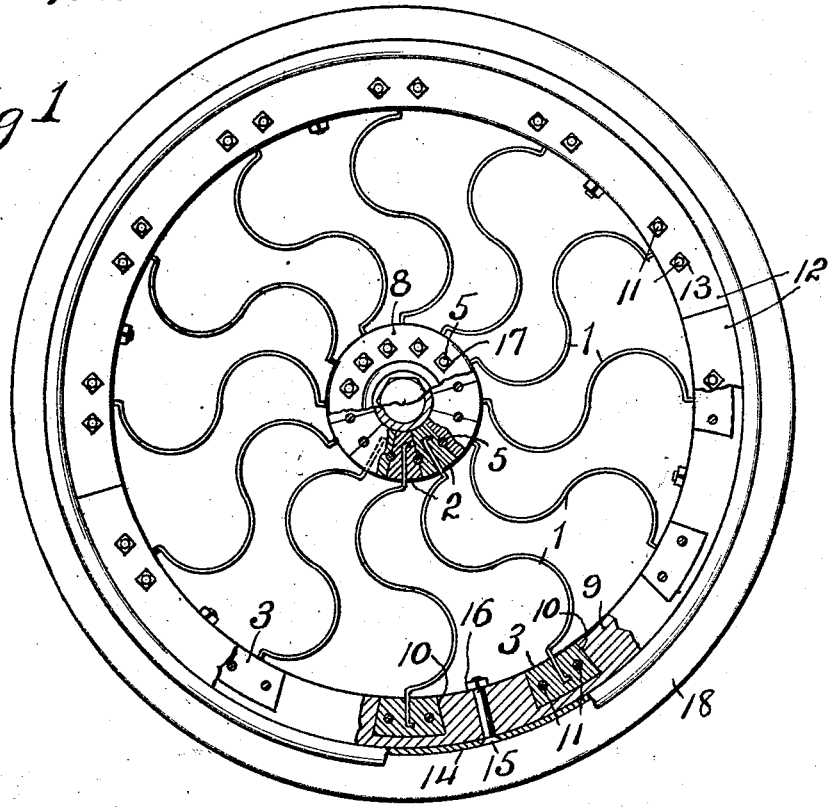
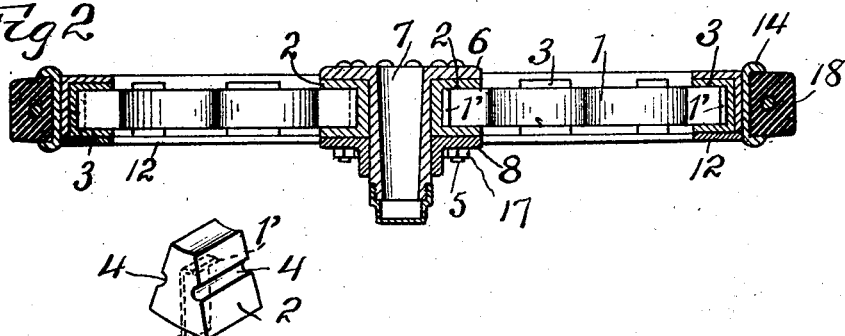
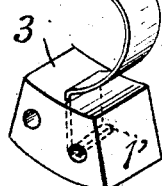
WITNESS:
R. E. Hamilton
INVENTOR.
George H. Hayes
BY
Warren D. House
His ATTORNEY

UNITED STATES PATENT OFFICE.

GEORGE H. HAYES, OF HAZELTON, KANSAS.

VEHICLE-WHEEL.

1,258,216.  Specification of Letters Patent.  Patented Mar. 5, 1918.

Application filed August 13, 1917. Serial No. 186,067.

*To all whom it may concern:*

Be it known that I, GEORGE H. HAYES, a citizen of the United States, residing at Hazelton, in the county of Barber and State of Kansas, have invented a certain new and useful Improvement in Vehicle-Wheels, of which the following is a specification.

My invention relates to improvements in vehicle wheels.

The object of my invention is to provide a vehicle wheel which will have great resiliency, which is cheap to make, which is durable, which is not liable to get out of order, which may be quickly and easily repaired, and which may be advantageously used as a substitute for automobile wheels employing pneumatic tires.

The novel features of my invention are hereinafter fully described and claimed.

In the accompanying drawing which illustrates the preferred embodiment of my invention, Figure 1 is a view partly in side elevation and partly broken away of my improved vehicle wheel.

Fig. 2 is a central cross section of the same.

Fig. 3 is a perspective view of one of the resilient spokes and the two blocks attached thereto.

Like reference characters designate like parts in the different views.

1 designates the resilient spokes. Each spoke is longitudinally resilient, that is, capable of being compressed lengthwise and of then rebounding and is, preferably, of S shape. The ends of the spoke 1 are respectively secured, preferably by being embedded therein, to an inner block 2 and an outer block 3.

Each of the blocks 2 and 3 has two opposite sides inwardly converging, the converging sides of each block 2 having each a transverse groove 4 adapted to receive therein a bolt 5, which extends through a flange 6 of a hub 7, and through a collar 8 which is mounted on the hub.

The blocks 2 form a circle around the hub 7 and are clamped by the collar 8 to the flange 6 by the bolts 5.

To hold the spoke 1 firmly in the blocks 2 and 3, it may have lateral bent portions 1' at its ends, as shown.

9 designates a felly having on its inner side a plurality of recesses 10 in which are respectively fitted the blocks 3. The recesses 10 extend from one side transversely into the felly, preferably terminating short of the opposite side of the felly. This construction permits the blocks 3 to be slipped laterally into the recesses 10 in which they may be held in any desired manner, as by transverse bolts 11 which extend through the felly 9, blocks 3 and arcuate side plates 12, which are clamped by nuts 13 to one side of the felly 9, and which cover the recesses 10.

The felly 9 may be secured in any desired manner to the inner side of a rim 14, as by radial bolts 15 which extend through the rim 14 and the felly 9, and which are provided at their inner ends with nuts 16. The bolts 5 are provided with nuts 17 which bear against the outer side of the collar 8.

If desired, the rim 14 may have mounted on it in the usual manner a solid rubber tire 18.

The spokes 1 being longitudinally resilient and of S shape, the wheel will have great resiliency and strength. The spokes may be of spring steel or other suitable material. If one breaks, it may be readily replaced by another one, by removing the collar 8 and one of the plates 12. The spoke with the blocks attached to it may then be slid laterally from the wheel and another spoke with blocks attached to it substituted for the broken spoke and accompanying blocks.

I do not limit my invention to the structure shown and described, as modifications, within the scope of the appended claims, may be made without departing from the spirit of my invention.

What I claim is:

1. In a vehicle wheel, resilient spokes, a hub, means for attaching one end of each of said spokes to said hub, blocks in which the other ends of said spokes are respectively embedded, said blocks each having two inwardly converging sides, and a felly having on its inner side recesses in which said blocks are respectively fitted.

2. In a vehicle wheel, a hub, inner blocks each having two inwardly converging sides, each provided with a transverse groove, bolts respectively disposed in said grooves for securing the blocks to the hub, outer blocks each having inwardly converging sides, a felly having on its inner side recesses in which said outer blocks are respectively fitted, and resilient spokes each having its ends respectively secured to an inner one and an outer one of said blocks.

3. In a vehicle wheel, a hub, inner blocks each having two inwardly converging sides, means for securing said blocks to said hub, outer blocks each having inwardly converging sides, a felly having on its inner side recesses in which the outer blocks are respectively fitted, and resilient spokes each having its ends respectively embedded in an inner one and an outer one of said blocks.

4. In a vehicle wheel, resilient spokes, blocks in which the outer ends of said spokes are respectively embedded, two opposite sides of each block converging inwardly, a felly having recesses on its inner side in which the blocks are respectively fitted, each recess extending transversely from one side of the felly, means secured to the felly and covering said recesses, and a hub to which the spokes at their inner ends are secured.

In testimony whereof I have signed my name to this specification.

GEORGE H. HAYES.

Copies of this patent may be obtained for five cents each, by addressing the "Commissioner of Patents, Washington, D. C."